May 12, 1959
R. A. MUNSE
2,885,754
SNAP-IN FASTENER
Filed Dec. 5, 1956
2 Sheets-Sheet 1
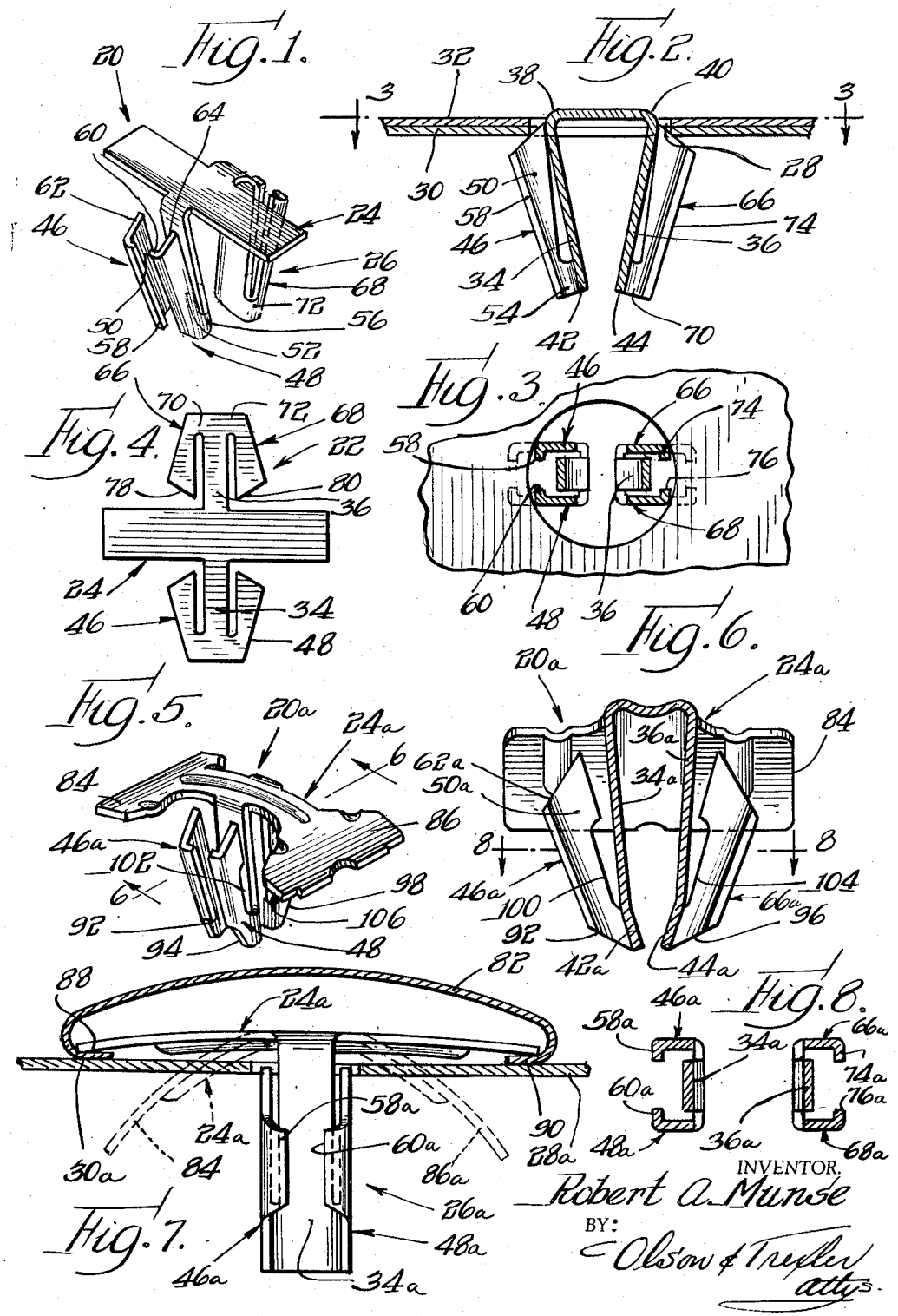
INVENTOR.
Robert A. Munse
BY:
Olson & Trexler
attys.

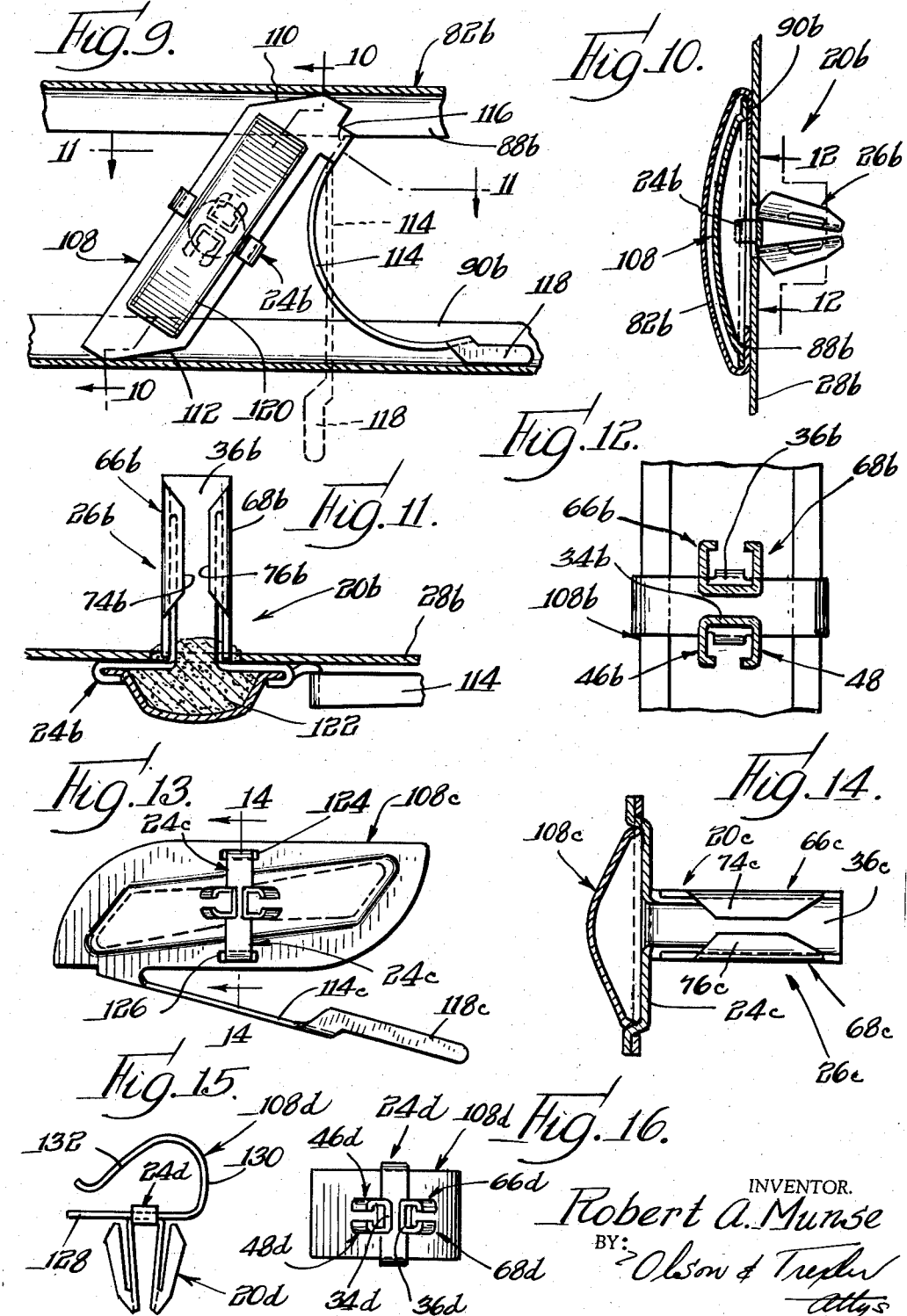

United States Patent Office 2,885,754
Patented May 12, 1959

2,885,754
SNAP-IN FASTENER

Robert A. Munse, Des Plaines, Ill., assignor to Illinois Tool Works, Chicago, Ill., a corporation of Illinois Application December 5, 1956, Serial No. 626,456

8 Claims. (Cl. 24—73)

The present invention relates to novel sheet material snap-in fasteners which may be adapted for connecting a pair of apertured members, for securing a molding strip or the like ton an apertured member, for mounting cables or the like on an apertured workpiece or for various other similar purposes.

An important object of the present invention is to provide a novel sheet material snap-in type fastener which is constructed so as to obtain increased strength and holding power and also so as to facilitate application of the fastener to an apertured workpiece.

Another important object of the present invention is to provide a novel sheet material snap-in type fastener having stud portions projecting from a head section for insertion through a workpiece aperture and elements integral with the stud portions for engaging the workpiece oppositely from the head section, which stud portions and elements are formed so that substantial savings in sheet material stock may be effected while providing a fastener which may be readily applied to an apertured workpiece and which has improved holding power.

Other objects and advantages of the present invention will become apparent from the following description and the accompanying drawings wherein:

Fig. 1 is a perspective view showing a fastener incorporating the features of the present invention;

Fig. 2 is an enlarged sectional view showing the fastener of Fig. 1 applied to an apertured workpiece assembly;

Fig. 3 is a sectional view taken generally along the line 3—3 in Fig. 2 but shows, in solid lines, the manner in which portions of the fastener are deflected as they are inserted through the work assembly aperture and further shows in broken lines the position of elements of the fastener when the fastener is fully applied to the work assembly as shown in Fig. 2;

Fig. 4 is a plan view showing a flat blank from which the fastener of Figs. 1–3 is formed;

Fig. 5 is a perspective view showing a modified form of the present invention;

Fig. 6 is an enlarged sectional view taken along line 6—6 in Fig. 5;

Fig. 7 is a sectional view showing in solid lines the manner in which the fastener of Figs. 5 and 6 may be utilized to secure a molding strip to an apertured panel and further showing in broken lines the normal position of the fastener head section before the fastener is applied to the apertured panel;

Fig. 8 is a sectional view taken along line 8—8 in Fig. 6;

Fig. 9 is a partial sectional view showing the manner in which a further modified fastener structure is capable of securing a molding strip to an apertured panel;

Fig. 10 is a sectional view taken along line 10—10 in Fig. 9;

Fig. 11 is an enlarged fragmentary sectional view taken generally along line 11—11 in Fig. 9;

Fig. 12 is an enlarged fragmentary sectional view taken along line 12—12 in Fig. 10;

Fig. 13 is an entering end view of another modified fastener structure incorporating the features of the present invention;

Fig. 14 is an enlarged sectional view taken along line 14—14 in Fig. 13;

Fig. 15 is a side elevational view showing a further modified fastener structure incorporating the features of the present invention; and Fig. 16 is an entering end view of the fastener structure shown in Fig. 15.

Referring now more specifically to the drawings wherein like parts are designated by the same numerals throughout the various figures, a fastener 20 incorporating the features of the present invention is shown in Figs. 1–3, which fastener is preferably formed from a one-piece resilient sheet material or metal blank 22 shown in Fig. 4. The fastener comprises a head section 24, and a stud section 26 adapted to be snapped through an aperture 28 in a workpiece or panel 30. While the fastener may be utilized for various purposes, it is shown assembled with the workpiece 30 and a second apertured workpiece 32 in Fig. 2 so as to interconnect these workpieces.

In this embodiment, the head section 24 is provided with a simple elongated rectangular configuration, and the stud section comprises a pair of leg portions 34 and 36 disposed with their broad surfaces in opposing relationship and respectively integrally connected to opposite margins of the head section by curved portions 38 and 40. The leg portions extend generally axially from the curved portions 38 and 40 and are also inclined inwardly so that their free terminal ends 42 and 44 respectively are disposed adjacent but preferably slightly spaced from each other.

Workpiece engageable elements or wings 46 and 48 are associated with the leg portion 34 in a manner such that major longitudinally extending portions 50 and 52 thereof are disposed substantially in planes traversing the plane of the broad surface of the leg portion 34. It is important to note that entering end portions of the wings are integrally joined to an entering end portion of the leg 34 by slightly curved sections 54 and 56 respectively, which curved sections are of short axial extent as compared with the wing and leg portions and respectively join longitudinally extending margins of the wing portions with opposite longitudinal extending margins of the leg portion. This arrangement provides stiff but resilinet connections between the wing portions and the leg portion so that the wing portions may be deflected laterally inwardly with respect to the leg portion 34 during application of the fastener to an apertured workpiece and so that the wing portions will be strongly urged laterally outwardly for aggressive engagement with the workpiece so as to improve the holding power of the fastener. This arrangement of the connection between the wing and leg portions also permits the fastener blank 22 to be formed so that the wing portions extend from the outer end of the leg portion back toward the head section so as to minimize the amount of stock material required for the fastener. It is also important to note that laterally outwardly disposed and longitudinally extending margins of the wing portions 46 and 48 respectively terminate in opposing flanges 58 and 60 substantially disposed in a plane traversing the planes of the major sections 50 and 52 of the wing portions, or, in other words, opposing the broad surface of the leg portion 34. It will be appreciated that when the blank is stamped from a sheet of stock material, the severed edges thereof will inherently be provided with small burrs. Thus, one advantage of the flanges 58 or 60 is that they locate the outer terminal edges of the wing portions so that any burrs thereon will not engage substantially the margin of a workpiece aperture during application of the fastener to the workpiece and restrain entry of the fastener stud section through the workpiece aperture, or, in other words, the flanges 58 and 60 present smooth surfaces which facilitates sliding of the fastener stud section through the workpiece aperture. The flanges 58 and 60 also serve to strengthen and rigidify the wing portions. Upper or free end edges 62 and 64 of the wing portions are inclined downwardly and outwardly for providing shoulders which are engageable with the under surface or edge of the workpiece for cooperating with the head section to secure the fastener with respect to the workpiece.

Workpiece engaging elements or wing portions 66 and 68 are integrally joined to the leg portion 36 of the stud section. These wing portions are identical to but oppositely disposed from the wing portions 46 and 48 described above and therefore need not be set forth in detail. It suffices to state that entering ends of the wing portions 66 and 68 have their longitudinally extending margins joined to opposed longitudinal margins of the leg portion 36 by axially short slightly curved sections 70 and 72, and outer longitudinal margins of these wing portions terminate in opposed flanges 74 and 76, and the wing portions are provided with downwardly and outwardly inclined workpiece engaging edges or shoulders 78 and 80.

When assembling the fastener 20 with an apertured workpiece or an assembly of workpieces as shown in Fig. 2, the relatively narrow entering end of the fastener stud section is first inserted into the aperture. It will be noted that the outer margins or flanges of the wing portions on the opposing leg portions are inclined toward each other at a greater angle than the angle of inclination of the leg portions so as to reduce the overall width of the entering end of the shank section and thereby facilitate initial entry of the shank section into a workpiece aperture. This arrangement of the outer wing portion margins also results in a progressively narrowing of the wing portions from their upper or free ends toward their integral connections with the leg portions so as to provide the wing portions with desired resiliency which facilitates application of the fastener to the workpiece and provides for aggressive engagement of the end shoulders of the wing portions with the workpiece. After the entering end of the stud section is inserted into a workpiece aperture, it is merely necessary to force the fastener axially inwardly. As the stud section passes through the aperture, the entering ends of the leg portions are deflected substantially together and the pairs of wing portions 46—48 and 66—68 are deflected inwardly and around their associated leg portion as shown in solid lines in Fig. 3. Then when the inclined upper edges or shoulders of the wing portions pass into the workpiece aperture, the resilient sheet metal urges the leg portions and the wing portions toward their normal or unflexed positions so that the shoulders are aggressively urged into engagement with the workpiece. It will be appreciated that the inclined formation of the edges 62—64 and 68—70 of the wings enables the fastener to be applied to workpieces having apertures of various diameters within predetermined limits.

In Figs. 5–8, there is shown a modified form of the present invention which is similar to the above described structure as indicated by the application of identical reference numerals with the suffix *a* added to corresponding elements. In this embodiment the head section 24*a* is formed so that it is particularly adapted for securing a molding strip 82 or the like to the apertured workpiece or panel 30*a*. Thus, opposite end portions of the head section are provided with enlargements 84 and 86 for obtaining broader contact with internal flanges 88 and 90 of the molding strip. In addition the opposite end portions of the head section are initially curved downwardly or toward the stud section as shown in Figs. 5, 6 and in broken lines in Fig. 7 when the fastener is fully applied to the apertured workpiece and molding strip, the opposite end portions of the head section are deflected upwardly to the solid line positions shown in Fig. 7 and the inherent resiliency of the fastener material causes the molding strip to be aggressively clamped against the workpiece.

The stud section of the fastener 20*a* differs from the stud section described above in that entering end portions 42*a* and 44*a* of the legs 34*a* and 36*a* are inclined relatively sharply toward each other and entering ends of the wing portions are beveled as indicated at 92, 94, 96 and 98 for further facilitating initial entering of the stud section into a workpiece aperture. In addition, inner longitudinal margins of the wing portions are respectively notched as indicated at 100, 102, 104 and 106 so as to provide the wing portions with the desired controlled degree of resiliency or flexibility. It is to be understood, that a fastener having the modified stud section shown in Figs. 5–8 and the head section of the embodiment of Figs. 1–4 may be provided if desired.

A further modified form of the present invention is shown in Figs. 9–12 wherein elements corresponding to those described above are identified by identical reference numerals with the suffix *b* added. In this embodiment the leg portions of the shank section are substantially straight like those of the fastener 20 and the wing portions have their inner margins notched and their free entering ends beveled in a manner similar to the wing portions of the fastener 20*a*. This embodiment further differs in that a separate head member 108 is interconnected with the head section 24*b* for retaining a molding strip 82*b* against the apertured workpiece or panel. The head member 108 comprises an elongated sheet material body having its longitudinal axis traversing the longitudinal axis of the head section 24*b*, and opposite end portions of the head section 24*b* are folded over opposite longitudinal marginal portions of the head member for securing the head member to the head section. The fastener 20*b* is adapted to be turned in the workpiece aperture so as to position opposite ends of the head member 108 against opposite sides of the molding strip, which opposite ends of the head member are beveled as at 110 and 112 so that the head member is adapted to be applied to molding strips of different widths or to spaced areas of a tapering molding strip. In order to maintain the ends of the head member in engagement with opposite sides of the molding strip, an elongated flexible element 114 is integrally connected to a projection 116 adjacent one end of the head member and is adapted to engage the side of the molding strip adjacent the opposite end of the head member for applying a torque to the fastener in a manner which urges the ends of the head member against the opposite sides of the molding strip. The flexible element 114 is normally positioned as shown in broken lines in Fig. 9 and is flexed as shown in solid lines when the fastener is applied to the molding strip. A major portion of the element 114 is preferably disposed so that its broad surfaces are in planes traversing the plane of the head member, and an end portion 118 of the flexible element is twisted so that it is disposed in a plane substantially parallel to the plane of the head member so as to facilitate entry thereof between the inturned flange and the upper side of the molding strip. The body member 108 is provided with a central upwardly embossed portion 120 which provides a cavity therebeneath, and a body 122 of soft pliable sealing material is trapped within this cavity by the head section 24*b* and also extends outwardly around the head section 24*b* for sealing the workpiece aperture.

Figs. 13–14 show another embodiment of the present invention wherein a head member 108*c* is interconnected with the head section 24*c* of the fastener. In this embodiment the end portions of the head section 24*c* project axially outwardly through slots 124 and 126 in opposite margins of the head member and then laterally outwardly over these margins for interconnecting the head member and the head section. This arrangement positively precludes the head member from slipping in the direction of its longitudinal axis relative to the head section 24c since the ends of the head section will engage the ends of the slots 124 and 126.

Figs. 15 and 16 show another embodiment of the present invention which is especially adapted for securing elongated elements such as cables or wires or various other articles to an apertured panel. In this embodiment the head member 108d is in the form of a generally U-shaped clip adapted to receive and retain an intermediate portion of a cable, not shown, or the like, which clip includes a first leg portion 128, a resilient bight portion 130 and a second leg portion 132 which preferably extends back toward the first leg portion. In the embodiment shown, the ends of the head section 24d are folded around the opposite margins of the clip leg portion 128, but, if desired, the clip leg portion 128 could be provided with slots similar to the slots 124 and 126 for receiving the ends of the head section 24d.

While the preferred embodiments of the present invention have been shown and described herein, it is obvious that many structural details may be changed without departing from the spirit and scope of the appended claims.

The invention is claimed as follows:

1. A sheet material snap-in fastener adapted to be applied to an apertured workpiece comprising a head section, and an integral shank section, said shank section including first and second elongated leg portions disposed with broad surfaces thereof in opposing relationship and extending generally axially from integral connections with said head section and having adjacent and separate free entering end portions, first and second pairs of wing elements respectively associated with and extending along and projecting transversely of said first and second leg portions, said first and second pairs of wing elements respectively having entering end portions of longitudinal inner margins thereof integrally connected with opposite longitudinal margins of said first and second leg portion entering end portions, remaining longitudinal inner margin portions of said first and second pairs of wing elements being separated from said leg portions, outer longitudinal margins of said pairs of wing elements respectively terminating in flanges separate from each other and presenting substantially smooth workpiece engageable surfaces for facilitating entry of the shank section into a workpiece aperture, and shoulder means on said wing elements engageable with a workpiece oppositely from said head section for securing the fastener to the workpiece, said pairs of wing elements resiliently collapsing inwardly relative to their associated leg portion during application of the fastener to a workpiece and then urging said shoulder means into aggressive engagement with the workpiece when the fastener is fully applied.

2. A fastener, as defined in claim 1, which includes a separate head member connected with said head section for retaining an article in assembled relationship with an apertured workpiece.

3. A fastener, as defined in claim 2, wherein said head section includes opposite end portions extending around and projecting over opposite margins of said head member for connecting said head member to said head section.

4. A fastener, as defined in claim 2, wherein said head member is provided with spaced slot means, and wherein said head section includes opposite end portions respectively projecting through said slot means and over said head member for connecting said head member to said head section.

5. A sheet material snap-in fastener adapted to be applied to an apertured workpiece comprising a head section, and an integral shank section, said shank section including a pair of leg portions respectively extending generally axially from integral connections with spaced margins of said head section and having adjacent and separate free entering end portions, a wing element associated with and extending along one of said leg portions and disposed in a plane extending transversely of a plane containing said one leg portion, said wing element having an entering end portion of a longitudinal margin thereof integrally connected with a longitudinal margin of said one leg portion entering end portion, the remainder of said wing element being separate from said one leg portion, said wing element having an outer longitudinal margin terminating in a flange projecting laterally of said first mentioned plane for presenting a free edge thereof away from a workpiece and for presenting a substantially smooth workpiece engageable surface for facilitating entry of the shank section into a workpiece aperture, and shoulder means on said wing element and carried by the other of said leg portions engageable with a workpiece oppositely from the head section for securing the fastener to a workpiece, said wing element resiliently collapsing inwardly relative to said one leg portion during application of a fastener to a workpiece and urging the shoulder means thereon into aggressive engagement with a workpiece when the fastener is fully applied.

6. A fastener, as defined in claim 5, which includes a second wing element similar to and oppositely disposed from said first mentioned wing element and having an entering end portion integrally joined to a second longitudinal margin of said one leg portion entering end portion.

7. A fastener, as defined in claim 5, wherein an inner longitudinal margin of said wing element is recessed for providing said wing element with predetermined yieldability.

8. A sheet material snap-in fastener adapted to be applied to an apertured workpiece comprising a head section, and an integral shank section, said shank section including first and second elongated leg portions respectively extending generally axially and inclined inwardly from integral connections with laterally spaced portions of said head section and having adjacent and separate free entering ends, first and second pairs of wing elements respectively associated with and extending along said first and second leg portions, a plurality of axially short transversely curved sections respectively integrally joining entering end portions of longitudinal inner margins of the first wing elements with opposite longitudinal margins of said first leg portion and entering end portions of longitudinal inner margins of said second pair of wing elements with opposite longitudinal margins of said second leg portion, said wing elements being disposed in planes traversing planes of said leg portions and being disposed laterally outwardly of adjacent longitudinal margins of the leg portions, outer longitudinal margins of said wing elements respectively terminating in flanges separate from each other and traversing said first mentioned planes provided by free end edges of the wing elements presenting substantially smooth workpiece engageable surfaces for facilitating entry of the shank section into a workpiece aperture, and shoulder means on said wing elements axially spaced from entering ends thereof for engaging a workpiece oppositely from the head section for securing the fastener to the workpiece, said pairs of wing elements resiliently collapsing inwardly relative to said leg portions during application of the fastener to a workpiece and then urging said shoulder means into aggressive engagement with the workpiece when the fastener is fully applied.

References Cited in the file of this patent

UNITED STATES PATENTS

| | | |
|---|---|---|
| 2,133,366 | Van Uum | Oct. 18, 1938 |
| 2,178,719 | Cotter | Nov. 7, 1939 |
| 2,180,925 | Dyresen | Nov. 21, 1939 |
| 2,246,720 | Churchill | June 24, 1941 |
| 2,618,824 | Poupitch | Nov. 25, 1952 |
| 2,627,094 | Bedford | Feb. 3, 1953 |

UNITED STATES PATENT OFFICE

CERTIFICATE OF CORRECTION

May 12, 1959

Patent No. 2,885,754

Robert A. Munse

It is hereby certified that error appears in the printed specification of the above numbered patent requiring correction and that the said Letters Patent should read as corrected below.

Column 1, line 11, for "ton" read -- to an --; column 6, line 54, beginning with "provided by free end", strike out all to and including "on said wing elements", in line 57, same column, and insert instead -- and presenting substantially smooth workpiece engageable surfaces for facilitating entry of the shank section into a workpiece aperture, and shoulder means on said wing elements provided by free end edges of the wing elements --.

Signed and sealed this 22nd day of September 1959.

(SEAL)
Attest:

KARL H. AXLINE
Attesting Officer

ROBERT C. WATSON
Commissioner of Patents